Nov. 3, 1970   A. E. MOULTON   3,537,722
SUSPENSION SYSTEMS
Filed June 24, 1968   5 Sheets-Sheet 4
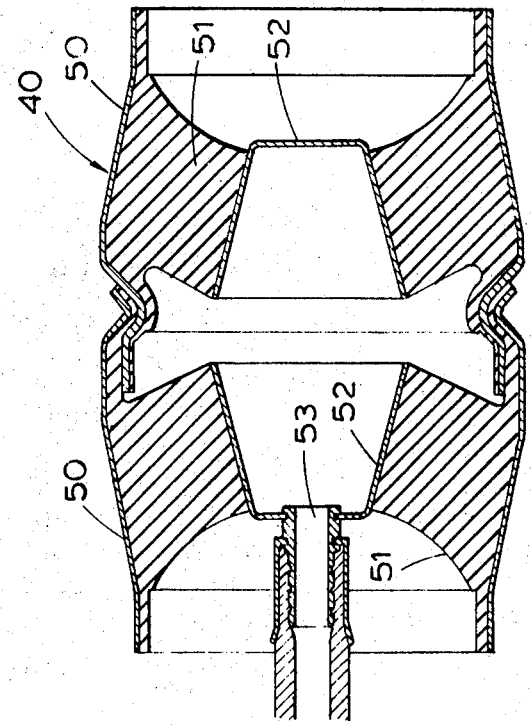
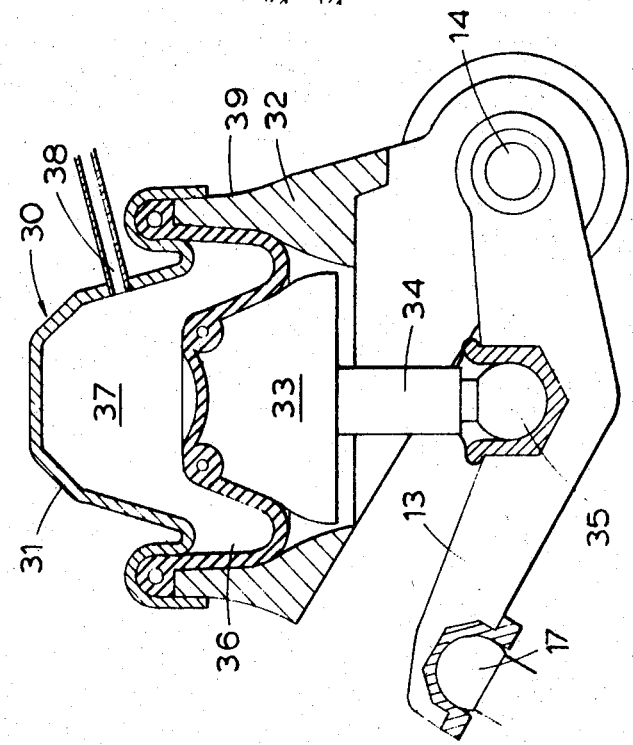
INVENTOR
ALEXANDER ERIC MOULTON
BY
Shoemaker and Mattare
ATTORNEYS Nov. 3, 1970 — A. E. MOULTON — 3,537,722
SUSPENSION SYSTEMS
Filed June 24, 1968 — 5 Sheets-Sheet 5

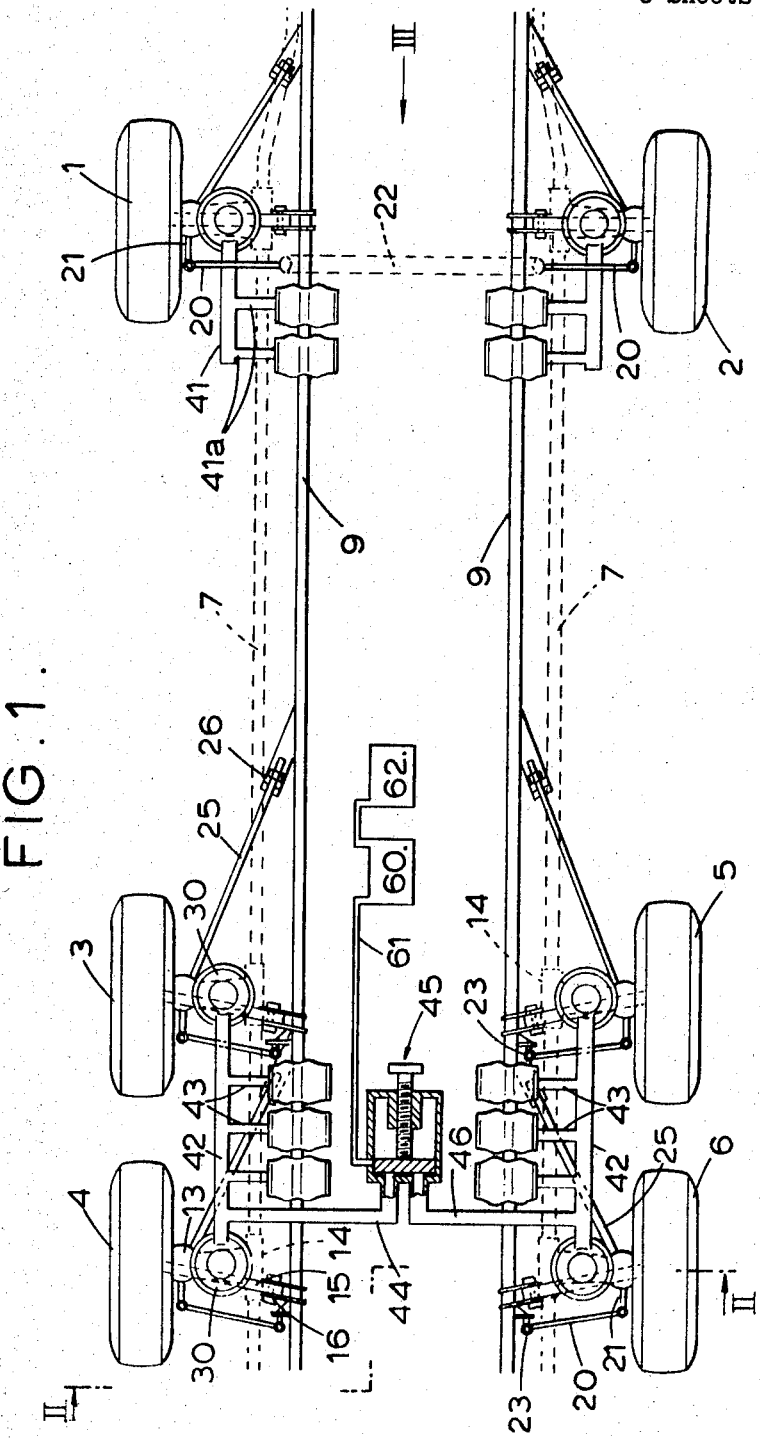

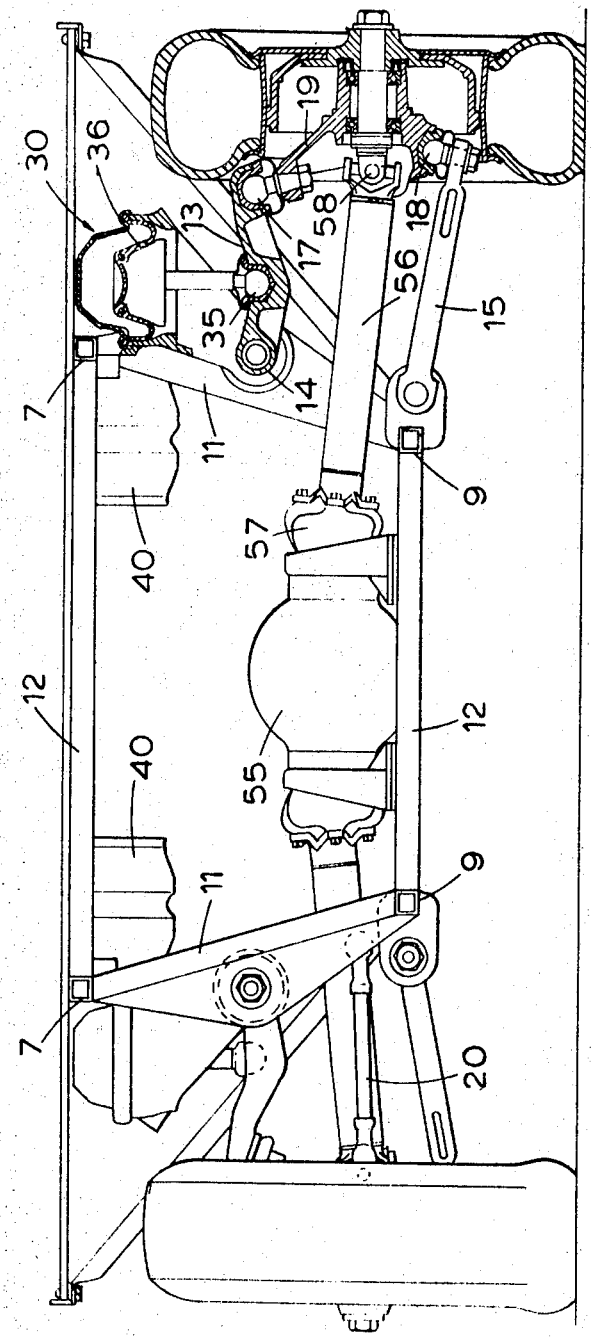

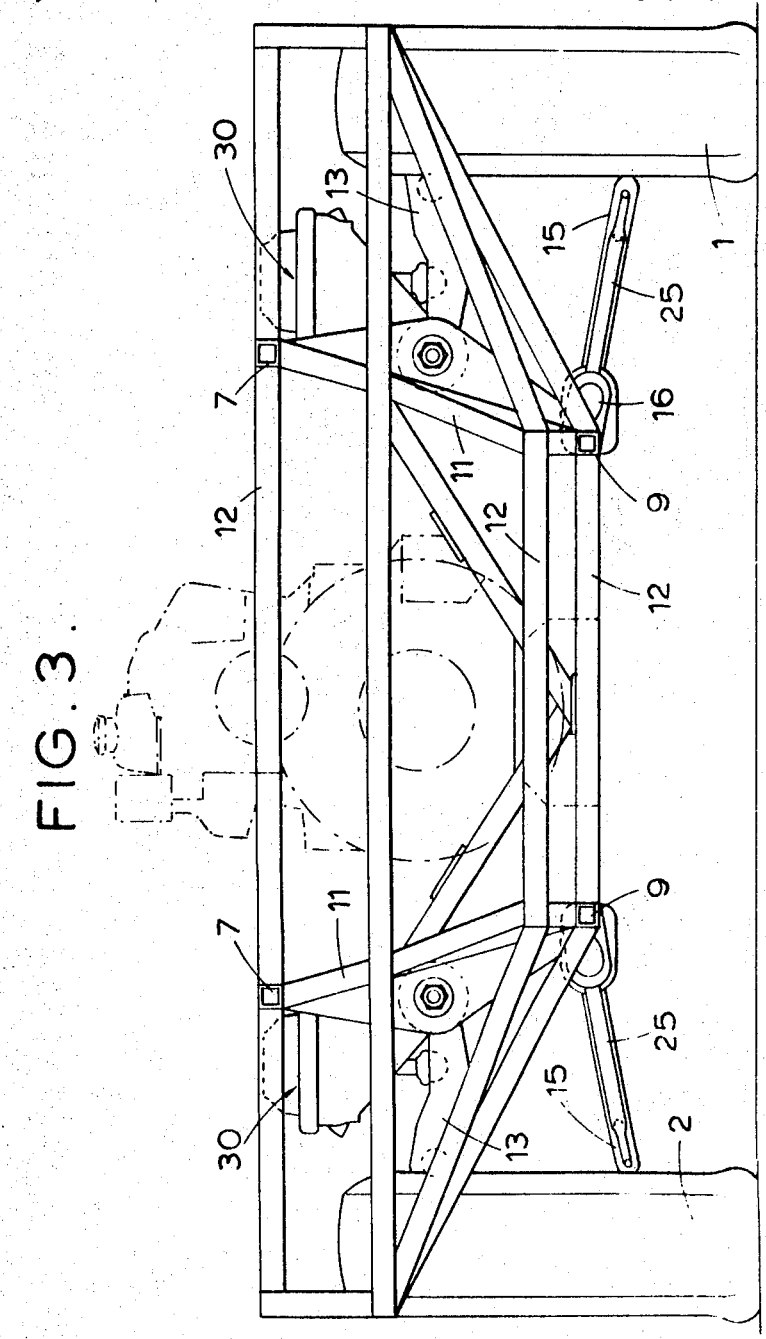

PISTON MOVEMENT

INVENTOR
ALEXANDER ERIC MOULTON
BY
Shoemaker and Mattare
ATTORNEYS

United States Patent Office 3,537,722
Patented Nov. 3, 1970

3,537,722
SUSPENSION SYSTEMS
Alexander Eric Moulton, Bradford-on-Avon, England, assignor to Moulton Developments Limited, Bradford-on-Avon, England, a British company
Filed June 24, 1968, Ser. No. 745,334
Claims priority, application Great Britain, June 22, 1967, 28,929/67; Jan. 20, 1968, 4,579/68
Int. Cl. B60g 13/08
U.S. Cl. 280—96.2
12 Claims

ABSTRACT OF THE DISCLOSURE

A chassis structure for a commercial vehicle having four or more road wheels wherein all wheels on each side have identical suspension systems including arms laterally from the spring structure of the vehicle and the arms being connected to the king pin assembly, and a hydraulic displacer operated by a part of the wheel suspension system, the displacer being in intercommunication with one or more hydraulic accumulator springs.

---

Figure 6:
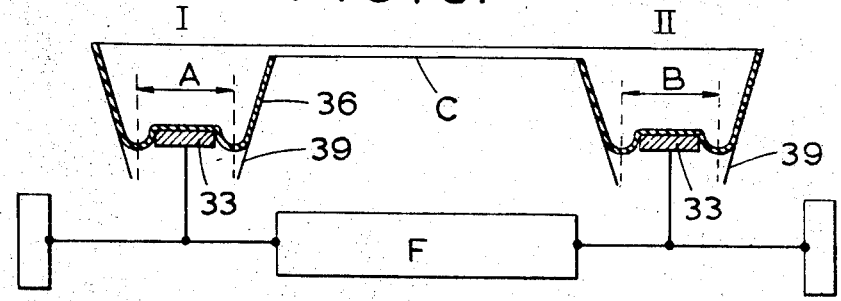

This invention relates to road vehicles and in particular to heavy road vehicles, that is, vehicles having a gross vehicle weight of 10,000 lbs. or more. The invention is concerned not only with passenger coaches and other vehicles where the laden and unladen weights do not differ significantly, but also with lorries or trucks where the loading upon the rear wheels when the vehicle is carrying its maximum load may be many times as great as the loading on the rear wheels when the vehicle is unladen.

Conventional heavy vehicles of the kind in question are equipped with two or more front steerable wheels and two or more rear non-steerable wheels and the rear wheels may be twin-tyred, in which case such a twin-tyred wheel assembly may be regarded as functioning and is herein referred to as if it were a single wheel.

Traditionally commercial vehicle chassis have been provided with few exceptions, with non-independent wheel suspensions. Non-independent wheel suspensions are characterised by an axle or analogous rigid member such as a de Dion beam extending across the vehicle and mounting the hubs of corresponding wheels at its opposite extremities.

The vehicle frame is supported on these axles by leaf springs. Such leaf springs are severely limited as to their softness. The springs are very stiff for two main reasons: firstly because of the large variation in load encountered between the laden and unladen conditions of the vehicle, and secondly, as the spring base, that is the distance between the springs supporting the opposite sides of the axle, is much narrower in the case of leaf springs than is the case with other types of spring, the capacity of the springs to reduce roll is limited unless they are made particularly stiff. Because of the very stiff springing provided on traditional commercial load-carrying vehicles of the heavy type in question, the frame provided on these known vehicles must be torsionally flexible to provide cross articulation. By the phrase "cross articulation" is meant the ability of the deriving wheels to be maintained in contact with the ground, even when other wheels of the vehicle have been lifted or lowered to such an extent that were the frame to be inflexible, the driving wheels would be lifted from contact with the ground. A regular test for this condition is to measure the height of a ramp up which any wheel of a vehicle can be driven before losing drive on another wheel. Typical good values for a truck would be 17–22 inches.

The stiff springing and torsionally flexible frame provided on traditional commercial vehicles of the heavier type impose severe limitations both on the ride and road-holding characteristics of the vehicle.

The ride of conventional commercial vehicles is further hindered by inter-friction set up between the leaves of the leaf springs during small wheel oscillations and because of this inter-leaf friction, the springs hardly function at all with such oscillations being absorbed by the tyres.

Not the least of the disadvantages of current conventional vehicles having such flexible frames is the phenomenon known as "cab nod" by which is meant that vibration which is set up in the driving cab due to the flexibility of the frame.

Some amelioration of ride discomfort and of the consequent risk of damage to goods may be derived from the use of air springs. However, air springs require continuously acting levelling devices in order to replenish any air which leaks from the suspension system. Air spring suspension systems also require continuously acting hydraulic dampers.

A great step forward, both as regards ride comfort and road-holding has been achieved in the last few years in passenger automobiles by the adoption of independent wheel suspension systems to all wheels. An independently suspended wheel has no such rigid mechanical connection with the corresponding wheel at the opposite side of the vehicle. Among the advantages achieved by independent wheel suspension systems may be mentioned the following. The spring base is considerably widened to that of the track so that the resistance to roll afforded by the suspension system is very considerably greater than that afforded by a system using a beam axle and leaf springs. As the resistance to roll is increased, the springs can be made much softer, thus contributing to ride comfort. By eliminating the axles the unsprung weight may be reduced by as much as 60% or more, enabling the wheels to be maintained in contact with the ground even under high frequency oscillations set up by the road surface. The interaction between one wheel and another due to gyroscopic effects is eliminated. The wheels may be individually and properly located against braking reactions and finally, friction both in the springs in the wheel locating linkages and in the steering assembly may more easily be reduced to a minimum and in the case of the steering, it is possible to utilize rack and pinion steering gear, which for a variety of reasons is efficient and advantageous.

However, the provision of independent wheel suspension at all wheels adds greatly to the complexity and therefore to the cost of manufacture and this invention has for its principal object to provide for a commercial vehicle chassis, an independent suspension system which is suitable for application at any wheel station of the vehicle whether or not the wheel is adapted to be steered and whether or not the wheel is a driving wheel. By this measure great simplicity of manufacture is achieved.

Moreover, with the provision of independent suspensions and with no axles, it is necessary to mount the wheel suspensions on a stiff structure. This must be achieved by providing the sprung structure with a high degree of inherent stiffness and particularly of torsional rigidity.

However, the provision of great torsional stiffness and rigidity in a chassis for a heavy vehicle, coupled with high roll resistance afforded by independent wheel suspension systems mitigates against cross articulation, and if the front wheels on one side are raised, for example by an inequality of terrain, the rear wheels on the same side will tend to be lifted also, with consequent risk of loss of driving wheel adhesion. This problem is particularly critical when the vehicle is unladen.

This invention provides for a commercial vehicle a chassis structure provided with four or more road wheels characterised in that all wheels on the same side of the vehicle have identical suspension systems in that each wheel suspension includes an upper arm and a lower longer arm extending laterally from upper and lower pivotal mountings on the sprung structure of the vehicle, the outer ends of the upper and lower arms being respectively connected by ball joints to an upper and lower portion of a king pin assembly mounting the wheel, there being a first link extending inwardly from a trailing lever arm on the king pin assembly and means associated with said arm for controlling orientation of the king pin assembly in the steering mode and a second link extending from the king pin assembly forwardly to a flexible mounting on the frame, said second link absorbing fore and aft reaction forces and the upper arm of the wheel suspension system operating an hydraulic displacer unit of the diaphragm type, the hydraulic displacer unit being in hydraulic intercommunication with one or more hydraulic accumulator springs.

The present invention has for a particular object to provide a chassis for a heavy commercial vehicle of the kind hereinbefore referred to which will give a smooth ride and good road-holding both when laden and in particular, when unladen, and in which cross articulation is provided for when the vehicle is required to traverse rough ground.

Therefore, according to a preferred embodiment, the present invention provides a chassis for a commercial vehicle having two or more independently suspended front steerable wheels and two or more independently suspended rear non-steerable driving wheels, the chassis including a torsionally stiff frame structure mounting first and second identical hermetically sealed fluid suspension systems associated respectively with the rear non-steerable wheels at each of the opposite sides of the vehicle, and including means which may be selectively operated to cause said first and second fluid suspension systems to interact exclusively with one another whereby the roll stiffness afforded to the rear of the chassis by said rear wheel suspension systems may be reduced as compared with when said first and second systems are not rendered interacting.

According to a preferred feature of this aspect of the invention, means are provided for injecting or removing hydraulic liquid from the fluid systems associated with the rear wheels of the vehicle so that the height of the sprung structure may be adjusted to suit various loadings.

Preferably the front steerable wheels of the vehicle are also provided with hydraulic suspension systems, with the suspension systems respectively associated with the front wheels at each of the sides of the vehicle being completely independent of one another at all times.

Figure 6A:
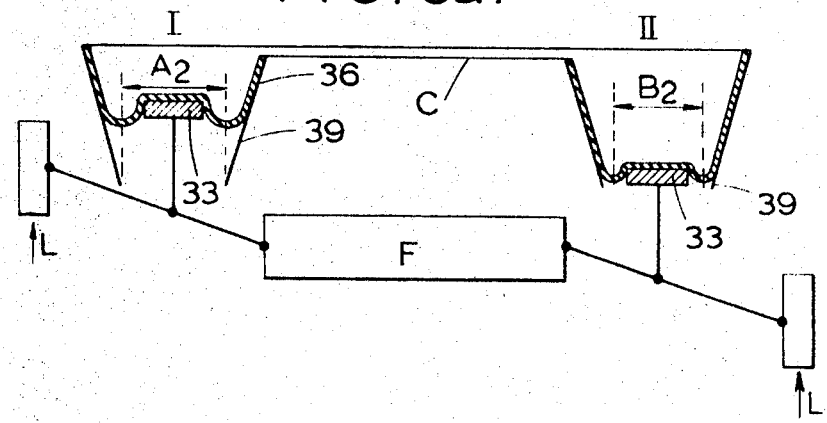
Figure 7:
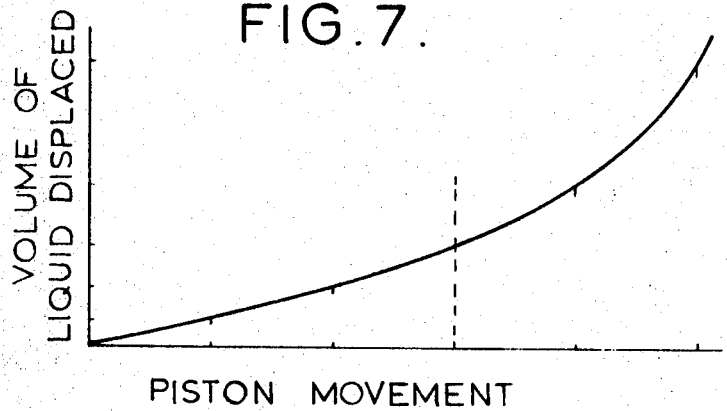

The invention will be further described by way of example with reference to the accompanying drawings in which, FIG. 1 is a diagrammatic plan view of a chassis for a commercial vehicle, FIG. 2 is an end view partly in cross section taken on the lines II-II of FIG. 1, FIG. 3 is an end view taken in the direction of the arrow III of FIG. 1, FIG. 4 is a detail view in cross section of a displacer, FIG. 5 is a detail view in cross section of an hydraulic accumulator spring, FIGS. 6 and 6a are diagrams illustrating how the rear suspension provides roll resistance in one mode of operation, FIG. 7 is a rate diagram in which the volume of fluid displaced from each displacer with increasing wheel deflection or stroke of the displacer piston is shown.

The chassis illustrated has two front steerable wheels 1 and 2. It further has four rear non-steerable driven wheels 3, 4, 5 and 6 arranged in tandem pairs at the opposite sides of the vehicle.

Each wheel is independently suspended with respect to a frame structure which is essentially stiff in the torsional mode.

In the embodiment illustrated the frame structure is constituted by two upper beams 7 and two lower beams 9 each of which extends longitudinally of the vehicle and each of which is maintained in spaced relationship from the others by lateral braces 11 and transverse braces 12 as is shown in FIGS. 2 and 3, so that the frame structure has a generally quadrilateral vertical transverse cross section formed by a top, a bottom and two opposite sides, each of which is rendered substantially stiff in its own plane by the lateral braces 11 and the transverse top and bottom braces 12.

Each wheel 1-6 has its own individual wheel suspension, each wheel suspension comprising an upper arm 13 extending laterally outwardly from a pivot 14 disposed longitudinally of the chassis and mounted on the lateral braces 11 of the frame approximately midway between the upper longitudinal beams 7 and the lower longitudinal beams 9. Each wheel suspension also includes a lower arm 15 extending outwardly from a pivot 16 carried on the frame at the level of the lower longitudinal beams 9.

The outer ends of the upper and lower suspension arms 13 and 15 are respectively connected by ball joints 17 and 18 to an upper and a lower portion of a king pin assembly generally designated 19, mounting the associated wheel. Each wheel suspension further includes a first link 20 extending inwardly from a trailing lever arm 21 on the king pin assembly 19. In the case of the front wheels 1 and 2 the links 20 are connected to rack and pinion steering gear generally designated 22. In the case of the rear wheels, the first links 20 are connected to the frame at 23.

It will be appreciated that the ball joints 17 and 18 allow each wheel to be rotated in the steering mode relative to the upper and lower locating arms 13 and 15, and that the first links 20 control the orientation of the king pin assembly 19 in the steering mode.

Each wheel suspension further includes a second link 25 extending from the king pin assembly 19 forwardly to a flexible mounting 26 on the frame, said second link 25 absorbing fore and aft reaction forces on its associated wheel.

The upper arm 13 of each wheel uspension operates its own hydraulic displacer generally designated 30 and as can be seen from FIGS. 2 and 4, each displacer 30 is of the rolling diaphragm type. Each displacer 30 is in hydraulic intercommunication with one or more hydraulic accumulator springs 40, one of which is shown in detail in FIG. 5.

From the drawings it will be seen that the independent wheel suspensions provided at each station are substantially identical so far as the elements previously described are concerned.

In the case of a front wheel suspension, in the embodiment shown in the drawings each displacer 30 is in hydraulic communication by means of conduit piping 41 having branches 41a, with two hydraulic accumulator springs 40 arranged to operate in parallel. The rear wheels are arranged in tandem pairs at each side of the vehicle and the displacers 30 of the tandem pairs are rendered hydraulically interconnected by means of a conduit pipe 42 from which lead branch connections 43 to three hydraulic accumulator springs 40 operating in parallel.

A conduit pipe 44 leads from hydraulic system associated with the left hand rear suspension to a valve generally designated 45 while a conduit 46 leads from the hydraulic system associated with the right hand rear wheel suspension to the valve 45, the valve 45 being operable either to open hydraulic intercommunication between the two identical systems formed, or to prevent flow along the conduits 44 and 46 whereby the two identical systems associated with the rear wheels at the opposite sides of the vehicle are rendered completely independent hydraulically of one another.

A feature of the embodiment of the invention illustrated will be apparent from FIGS. 2 and 3, from which it will be seen that as each displacer 30 is carried in a casing 32, which is pivotally mounted on pivots 14 for the upper suspension arms 13. Loadings transmitted by the upper suspension arms 13 will cause the displacer to pivot about the pivots 14 with the loadings caused by this tendency to pivot being fed transversely into the frame of the vehicle where they are absorbed by the upper transverse braces 12 bridging the longitudinal beams 7 and 9. By this method, suspension loadings are fed into the frame over widely distributed points. As will be apparent also from FIG. 2, the vehicle frame forms a convenient mounting for a differential assembly 55 from which drive shafts 56 extend laterally to drive each of the rear wheels, 57 and 58 being universal couplings provided on the drive shafts 56.

Each displacer 30 has a rigid housing 31 carried in a rigid casing 32 which is journalled on the associated pivot 14 of its wheel suspension. The displacer 30 further has a piston 33 which is connected by a strut 34 and a ball joint 35 to move with the upper wheel suspension arm 13 of the associated wheel suspension. Bridging the gap between the rigid housing 31 and the piston 33 is a generally frusto-conical flexible diaphragm 36 which together with the housing 31 defines a displacer chamber 37. The chamber 37 is liquid filled and has an outlet port 38 to which will be joined an interconnecting conduit (the conduit 41 in the case of a front wheel suspension, the conduit 42 in the case of a rear wheel suspension).

As each suspension arm 13 rises or falls, the associated piston 33 of its displacer unit will rise or fall also and liquid will be displaced to or from the chamber 37 of its associated displacer unit 30.

Each hydraulic accumulator spring 40 will now be described in greater detail with reference to FIG. 5. Each spring 40 comprises a rigid housing constituted by two identical components 50 which are rigidly connected end to end. Each component 50 is a hollow frusto-conical drum having bonded within its bore an annular body 51 of rubber which has a hollow bore within which is a cup-shaped member generally designated 52. In the base of one of the cup members 52 is a port 53 for connection to the branch connections 41a in the case of the front wheel suspensions, and 43 in the case of the rear wheel suspensions. The interior of the spring defined by the cup members 52 and the bodies of rubber 51 defines a chamber of variable volume which is completely filled with hydraulic fluid as are the conduit pipes 41, 41a, 42, 43, 44 and 46.

Dealing now with the operation of a front wheel suspension when the wheel rises, liquid will be displaced from the displacer unit 30 along conduits 41 and 41a into the interiors of the two hydraulic accumulator springs 40 operating in parallel. The influx of fluid into the interior of each spring 40 will cause the two cup members 52 to diverge with the surrounding rubber bodies 51 being deflected so that the influx of fluid is resiliently resisted. The deflection will be in both shear and compression due to the conical shaping of the cup members and of the housing 50. It will be appreciated, therefore, that the hydraulic system associated with each front wheel suspension will afford that suspension springing in the bounce and roll modes. It will be further noted that the hydraulic systems respectively associated with the wheel suspensions of the front wheels 1 and 2 at each side of the vehicle are completely independent of one another so that the functioning of the suspension associated with the front wheel 1 will be completely independent of the functioning of the suspension associated with the front wheel 2.

Damper valves may be included to control flow between the front displacers 30 and their associated hydraulic accumulator springs 40 to provide shock absorption.

In the case of the rear wheels it will be noted that the displacers associated with the wheels 3 and 4 in tandem are directly hydraulically interconnected by the conduit pipe 42. A similar arrangement pertains to the displacers 30 associated individually with the wheel suspensions of wheels 5 and 6. The conduits 42 are each connected by the conduits 43 with a battery of three hydraulic accumulator springs 40 operating in parallel. In all respects the displacers 30 and springs 40 are similar to those described above in connection with the front suspension.

The operation of the suspension systems associated with the rear wheels will now be described in the first place in the condition when the valve 45 is closed to prevent fluid flow along conduits 44 and 46 and for convenience of identification the hydraulic suspension system associated with the wheels 3 and 4 will be termed System I and the identical system associated with the wheels 5 and 6 will be termed System II.

Dealing with System I when both wheels 3 and 4 are raised simultaneously relative to the frame of the vehicle, fluid will be displaced from the displacers 30 associated with each of these wheels with the consequence that the pressure of the hydraulic fluid in System I as a whole will be raised and hydraulic liquid will enter all three hydraulic accumulator springs 40 of System I simultaneously. Such rise in hydraulic pressure and influx of fluid into the springs 40 will be resisted by the rubber bodies 51 in each of the springs 40. If, however, only one of the wheels 3 or 4 is raised, fluid will be displaced from its associated displacer into the displacer 30 of the wheel which is not raised and unless there is an overall increase in hydraulic pressure in the fluid System 1 the springs 40 will not be brought into operation. Consequently small irregularities in the road surface will be absorbed by fluid being transferred between the displacers 30 associated with the tandem pair of wheels 3 and 4 and only larger undulations will cause both wheels to rise. Similarly if the vehicle is driven round a corner and the frame rolls again both wheels will effecitvely rise relative to the frame, and the hydraulic pressure will be increased so that the battery of springs 40 will be brought into operation.

Similar considerations apply to System II associated with the wheels 5 and 6 and it will be seen that when the Systems I and II are rendered independent of one another, the valve 45 being closed, the springs 40 at the respective sides of the vehicle will provide resistance to bounce and roll.

However, it will be recalled that the provision of independent wheel suspensions at all wheels of the vehicle necessitates the use of a frame having great torsional stiffness and that a frame having such torsional stiffness mitigates against the condition of cross articulation. Thus, if the vehicle is afforded a high degree of roll stiffness by its wheel suspensions, when one of the front wheels is raised the rear wheels on the same side may be raised also and may be brought out of driving contact with the surface over which the vehicle is travelling. The present invention proposes to overcome this difficulty by providing that the degree of roll resistance afforded to the rear driving wheels may be reduced at will. This is accomplished by opening the valve 45 so that liquid flow can take place along the pipes 44 and 46 with suspension Systems I and II and being thereby interconnected. When Systems I and II are so interconnected, if the tandem wheels on one side of the vehicle are raised together, instead of this immediately causing such an increase in hydraulic pressure that the battery of springs pertaining to that side are brought into operation, fluid can be displaced through the pipes 44 and 46 to the identical system associated with he rear wheels in tandem on the opposite side of the vehicle. Provided that there is no overall increase in hydraulic pressure in the two systems taken together, none of the springs 40 will be brought into operation and the roll resistance afforded to the rear suspension will be significantly less when the valve 45 is open than when it is closed.

The valve 45 may be operated either manually or by remote control from the driver in his cab. Normally a high degree of roll resistance will be required when the vehicle is laden and the valve 45 will therefore be closed in this condition. However, when the vehicle is unladen and is traversing terrain where cross articulation is required, then the valve 45 will be opened to lower the roll resistance afforded by the rear suspensions.

However, even when the Systems I and II are interconnected, it is necessary to provide a minimum degree of roll resistance. This is preferably achieved according to this invention by using displacers 30 of the progressive rate type, so that as the wheel associated with one of the displacers rises from a given position, its displacer is caused to displace progressively increasing volumes of fluid for successive increments of wheel deflection, while as the wheel falls the fluid movement progressively decreases. How this is achieved will now be explained.

As will be seen from FIG. 4, the diaphragm 36 is constrained to roll from a surface 39 of the casing 32 which reduces in one direction to a surface of the piston 33 which reduces in diameter in the opposite direction. This condition is reproduced diagrammatically in FIGS. 6 and 6a.

In FIG. 6 the Systems I and II are shown in equilibrium with the wheels of System I at the same height relative to the frame F as the wheels associated with System II. C represents the conduit means 44, 46 which on suitable operation of valve 45 render the Systems I and II at the opposite sides of the vehicle interconnected. In the condition shown in FIG. 6, the effective area A of the diaphragms of the displacers of System I will be substantially equal to the effective area B of the diaphragms of the displacers 30 of System II.

If, however, the wheels of System I are raised relative to the frame F, the pistons 33 of each displacer of System I will be raised with fluid being displaced and the effective area A2 of the diaphragms 36 will be larger than the area A and the resistance to load L will progressively increase. When fluid is displaced from the displacers 30 of System I along the conduit C and into the displacers of System II, the pistons of these displacers will fall. As the piston of each displacer of System II falls, the effective area B2 progressively decreases and the resistance to load L will progressively decrease and the hydraulic system will tend to revert from the condition shown in FIG. 6a to the condition of equilibrium shown in FIG. 6. FIG. 7 illustrates graphically the volume of liquid displaced from the displacer with progressive increments of piston movement.

From the above discussion of FIGS. 6 and 6a, it will be appreciated that any displacers of the progressive rate type which are interconnected tend to adopt positions of equilibrium with respect to the applied load and this applies whether one considers the displacers 30 of the Systems I and II in interconnected condition, or the displacers of a tandem pair of wheels 3 and 4 or 5 and 6 which are interconnected by the conduits 42. Accordingly in the condition when valve 45 is operated to render Systems I and II independent from one another, the displacers 30 associated with each tandem pair of wheels tend to adopt positions of equilibrium.

According to a further preferred feature of the invention, provision is made whereby hydraulic fluid may be injected or removed from the hydraulic suspensions associated with the rear wheels of the vehicle. If the hydraulic pressure of the rear suspensions is raised, the frame of the vehicle will be raised relative to the wheels while if the hydraulic pressure of the suspensions is lowered, the frame of the vehicle will be lowered relative to the wheels. In order to ensure equality of the pressure in Systems I and II injection or removal of hydraulic fluid is preferably accomplished when the valve 45 is in open condition. Control of the hydraulic pressure in the rear suspension systems will be effected by conventional hydraulic pump generally designated 60 driven off the power unit or transmission of the vehicle. In FIG. 1 the hydraulic pump 60 is illustrated diagrammatically with a conduit pipe 61 feeding into the chamber of valve 45 from a reservoir 62 so that levelling can only be effected when valve 45 is in open condition.

I claim:
1. A vehicle chassis provided with four or more road wheels, wherein all the wheels on the same side of the vehicle have identical suspension in that each wheel suspension includes an upper arm and a lower longer arm extending laterally from upper and lower pivotal mountings on the sprung structure of the vehicle, the outer ends of the upper and lower arms being respectively connected by ball joints to an upper and lower portion of a king pin assembly mounting the wheel, there being a first link extending inwardly from a trailing lever arm on the king pin assembly and means associated with said arm for controlling orientation of the king pin assembly in the steering mode and a second link extending from the king pin assembly forwardly to a flexible mounting on the frame, said second link absorbing fore and aft reaction forces and the upper arm of the wheel suspension system operating an hydraulic displacer unit of the diaphragm type, the hydraulic displacer unit being in hydraulic intercommunication with one or more hydraulic accumulator springs.

2. A vehicle chassis according to claim 1 wherein in the case of a steerable wheel said first link is connected at its inner end to rack and pinion type steering gear whereby said link may transmit steering movements from the steering gear to its associated king pin.

3. A vehicle chassis according to claim 1 wherein in the case of a non-steerable wheel said first link has its inner end anchored to the spring structure of the chassis.

4. A chassis according to claim 1 wherein the displacers are of the progressive rate type.

5. A chassis according to claim 1 wherein the hydraulic accumulator springs are each of the kind incorporating rubber springs which are deflected in shear and compression.

6. A vehicle chassis having two or more independently suspended front steerable wheels and four independently suspended rear non-steerable driving wheels, the chassis including a torsionally stiff frame structure extending between the front and rear wheels, said frame structure mounting the rearwheels in tandem arrangement, two at each side of the vehicle and wherein each individual rear wheel suspension operates it own hydraulic displacer unit, the displacer units associated with the wheel suspensions of the wheels in tandem on the same side of the vehicle being interconnected hydraulically and being jointly in fluid flow intercommunication with at least one hydraulic accumulator spring, and including a conduit pipe extending between the pair of systems so formed and respectively associated with the tandem wheels at the respective sides of the vehicle, there being valve means in said conduit pipe which are operable both to provide fluid flow intercommunication between said pair of systems and to prevent such intercommunication so that the two systems operate independently of one another.

7. A chassis according to claim 6 wherein each wheel suspension includes an upper arm and a lower longer arm extending laterally from upper and lower pivotal mountings on the frame, the outer ends of the upper and lower arms being respectively connected by ball joints to an upper and a lower portion of a king pin assembly mounting the wheel, there being a first link extending inwardly from a trailing lever arm on the king pin assembly and means associated with said arm for controlling orientation of the king pin assembly in the steering mode, and a second link extending from the king pin assembly forwardly to a flexible mounting on the frame, said second link absorbing fore and aft reaction forces.

8. A chassis according to claim 7 wherein in the case of the front steerable wheels the first link is connected to rack and pinion steering gear while in the case of the rear non-steerable wheels the said first link is anchored to the frame.

9. A chassis according to claim 7 wherein the upper arm of each wheel suspension operates the displacer associated with that wheel suspension.

10. A chassis according to claim 9 wherein each displacer is carried in a casing which is pivotally mounted on a journal shaft by means of which said upper arm is pivotally mounted with respect to the vehicle frame with upward movement of the upper arm being transmitted to the displacer and tending to cause said casing to pivot about said journal the forces occasioned by such tendency of the casing to pivot being fed transversely into the frame.

11. A vehicle chassis having at the front, an arrangement of two or more independently suspended front steerable wheels and at the rear an arrangement of two or more independently suspended rear non-steerable driving wheels, the chassis including a torsionally stiff frame structure extending between the front and rear wheels, at least one of said front and rear wheel suspensions arrangements including two wheels in tandem at each side of the vehicle with each individual wheel suspension operating its own hydraulic displacer unit, the displacer units associated with the wheel suspensions of the wheels in tandem on the same side of the vehicle being interconnected hydraulically and being jointly in fluid flow intercommunication with at least one hydraulic accumulator spring; and including further, means for selectively increasing and decreasing the volumes of hydraulic fluid, simultaneously, in the two hydraulic systems respectively associated with the tandem pairs of wheels at the opposite sides of the vehicle.

12. A chassis according to claim 11 wherein the displacer units are each of the progressive rate type and including valve means, damping the flow of hydraulic fluid to and from each individual displacer unit.

References Cited

UNITED STATES PATENTS

| 2,928,486 | 3/1960 | Van Meter | 280—6 X |
| 2,966,366 | 12/1960 | Moulton | 280—124 X |
| 2,976,052 | 3/1961 | Hanna | 280—112 |
| 2,978,254 | 4/1961 | Bundorf | 280—124 X |
| 3,019,029 | 1/1962 | Sampietro | 280—124 |
| 3,031,204 | 4/1962 | De Lorean | 280—124 |
| 3,136,565 | 6/1964 | Bischoff et al. | 280—96.2 |
| 3,191,954 | 6/1965 | Schuetz | 280—6 |
| 3,197,231 | 7/1965 | Holtzman | 280—6 X |
| 3,223,433 | 12/1965 | Parks | 280—96.2 |
| 3,356,954 | 12/1967 | Gottschalk | 280—6 |

KENNETH H. BETTS, Primary Examiner

U.S. Cl. X.R.

280—124